United States Patent [19]

Sugimoto et al.

[11] Patent Number: 4,806,351
[45] Date of Patent: Feb. 21, 1989

[54] RUBBER LAMINATE

[75] Inventors: Masatoshi Sugimoto, Nagoya; Toshiki Kurosaki, Aichi, both of Japan

[73] Assignee: Toyoda Gosei Co., Ltd., Nishikasugai, Japan

[21] Appl. No.: 93,162

[22] Filed: Sep. 1, 1987

Related U.S. Application Data

[63] Continuation of Ser. No. 853,765, Apr. 18, 1986, abandoned.

[30] Foreign Application Priority Data

Apr. 19, 1985 [JP] Japan ................................. 60-85244
Apr. 23, 1985 [JP] Japan ................................. 60-87102

[51] Int. Cl.$^4$ ............................................ B32B 27/00
[52] U.S. Cl. ................................ 428/421; 428/36.8; 428/520; 428/522
[58] Field of Search ................. 428/421, 520, 522, 36, 428/376; 525/368

[56] References Cited

U.S. PATENT DOCUMENTS

| | | | |
|---|---|---|---|
| 2,833,752 | 5/1958 | Honn et al. ........................ | 525/368 |
| 4,259,463 | 3/1981 | Moggi et al. ....................... | 428/421 |
| 4,361,608 | 11/1982 | Furukawa et al. ................. | 428/421 |
| 4,394,205 | 7/1983 | Blenner ............................. | 428/421 |
| 4,395,462 | 7/1983 | Polmanteer ....................... | 428/421 |
| 4,457,799 | 7/1984 | Dunn .................................. | 428/421 |
| 4,563,393 | 1/1986 | Kitagawa et al. ................. | 428/421 |

FOREIGN PATENT DOCUMENTS

| | | |
|---|---|---|
| 0089162 | 9/1983 | European Pat. Off. . |
| 57-49391 | 10/1982 | Japan . |
| 59-33304 | 8/1984 | Japan . |

*Primary Examiner*—Sharon A. Gibson
*Attorney, Agent, or Firm*—Cushman, Darby & Cushman

[57] ABSTRACT

This invention is directed to a rubber laminate that produces a sufficient bonding strength between a FKM layer and a NBR layer. The FKM layer is made of a FKM compound containing a polyol vulcanization system in which a vulcanization accelerator is incorporated in an amount more than usual, or a FKM compound of peroxide vulcanization system in which a vulcanizing agent and accelerator used for the polyol vulcanization system is incorporated along with the peroxide vulcanization system. The NBR layer is made of a NBR compound incorporated with an oxide or hydroxide of a metal selected from Goups II to IV of the Periodic Table such as calcium hydroxide in an amount more than usual. The rubber laminate of this invention is suitable for rubber hoses and rubber diaphragm.

8 Claims, 1 Drawing Sheet

RUBBER LAMINATE

This is a continuation of application Ser. No. 853,765, filed Apr. 18, 1986 which was abandoned upon the filing hereof.

BACKGROUND OF THE INVENTION

The present invention relates to a rubber laminate in which a FKM layer and a NBR layer are bonded together through vulcanization. It is suitable for an automotive fuel hose and fuel pump diaphragm. "FKM" and "NBR" used in this specification stand for fluororubber and nitrile rubber, respectively. "PHR" denotes an outer percentage based on the amount of rubber or polymer.

Being superior in heat resistance, chemical resistance, aging resistance, low-temperature resistance, and oil and fuel resistance, FKM is considered as a promising raw material for a fuel hose, fuel pump diaphragm, and chemical-resistant hose and packing. However, its usage is limited because of its high price. It costs 10 to 20 times higher than general-purpose rubber such as NBR. One way of overcoming this disadvantage is to use FKM in combination with NBR. For example, where FKM is used as a raw material for a fuel hose, the base layer is made of NBR, which is a general-purpose rubber having a comparatively good oil resistance, and the layer required to have a high performance is made of FKM, and the two layers are bonded together through vulcanization. In actual, however, the bonding of the two layer is difficult to achieve by the ordinary method. This holds true particularly of an FKM layer made of a rubber compound for peroxide vulcanization. In the meantime, FKM of peroxide vulcanization type cures faster and more densely than FKM of polyamine-polyol vulcanization type. Therefore, it provides a low compression set without secondary cure.

In order to improve the bonding between a FKM layer and a NBR layer, there was proposed an unvulcanized NBR compound containing a metal oxide such as magnesium oxide and silica, as disclosed in Japanese patent publication Nos. 49391/1982 and 33304/1984. This method, however, does not provide a sufficient bond strength between the two layers.

SUMMARY OF THE INVENTION

It is an object of the present invention to provide a rubber laminate composed of a FKM layer and a NBR layer firmly bonded together. The FKM layer is made of a FKM compound of polyol vulcanization type which is incorporated with an organic phosphonium salt and/or quaternary ammonium salt as a vulcanization accelerator in an amount more than usual. Or, the FKM layer is made of a FKM compound incorporated with accelerators for polyol vulcanization as well as peroxide vulcanization. The NBR layer is made of an NBR compound incorporated with a specific amount of metal oxide. This metal oxide is in addition to a metal oxide or metal hydroxide which might be previously incorporated into the compound. The FKM layer and the NBR layer are bonded together through vulcanization.

DESCRIPTION OF THE PREFERRED EMBODIMENTS

Figure 1:
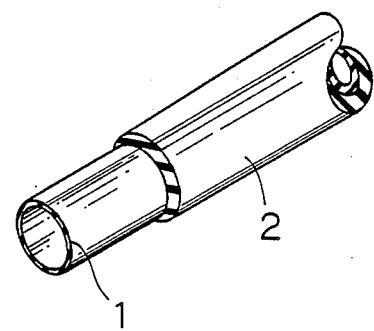
FIG. 1 is a perspective view of a rubber hose which is an example of the rubber laminate of the invention.

The rubber laminate of this invention is composed of a FKM layer and a NBR layer bonded together through vulcanization. The two layers have the construction mentioned below.

(A) FKM layer

There are two kinds of FKM layers which are used in this invention. One is made of a FKM compound of polyol vulcanization type which is incorporated with an organic phosphonium salt and/or quaternary ammonium salt as a vulcanization accelerator in an amount more than usual. The other one is made of a FKM compound of peroxide vulcanization type incorporated with a vulcanization agent and accelerator for polyol vulcanization in addition to accelerators for peroxide vulcanization.

(1) The FKM may be either a bipolymer or a terpolymer. The FKM intended for peroxide vulcanization is one which contains in the polymer molecule iodine or bromine atoms having radical activity. Examples of the bipolymer include vinylidene fluoride-propylene hexafluoride copolymer. It is commercially available under the trade name of Viton A, Viton E45, Viton E60, Dai-el G704, Dai-el G702, Dia-el G501, Dai-el G601, or Dai-el G801. Examples of the terpolymer include vinylidene fluoride-propylene hexafluoride-ethylene tetrafluoride terepolymer. It is commercially available under the trade name of Viton GF, Viton GH, Viton VTR5362, Dia-el G901, or Dai-el G902. "Viton" and "Dai-el" are Du pont's trademark and Daikin Kogyo's trademark, respectively.

(2) The polyol vulcanizing system therefor contains, in addition to an aromatic polyol compound as a vulcanizing agent, an organic phosphonium salt or quaternary ammonium salt as a vulcanization accelerator and other auxiliaries. The amount of the aromatic polyol is 1.3 to 2 PHR, which is normal. The amount of the vulcanization accelerator is more than usual (0.3 to 0.45 PHR). It is 0.5 to 2.2 PHR for bipolymer FKM and 0.8 to 2.7 PHR for terpolymer FKM. If the amount of the vulcanization accelerator is less than the above-mentioned value, the effect of this invention (good vulcanization bonding to the NBR layer) is not produced. With the amount of the vulcanization accelerator in excess of the above-mentioned value, the FKM layer suffers scorching in the step of vulcanization bonding.

Examples of the above-mentioned aromatic polyol include hexafluoro-isopropylidene-bis-(4-hydroxyphenyl)-hydroquinone and isopropylidene-bis-(4-hydroxyphenyl). Examples of the organic phosphonium salt include triphenylbenzylphosphonium chloride, tetraphenylphosphonium chloride, and tetraoctylphosphonium chloride. Examples of the quaternary ammonium salt include triphenylbenzylammonium chloride and tetraphenylammonium chloride.

(3) The peroxide vulcanizing system contains, in addition to an organic peroxide as a vulcanization agent, triallylisocyanurate as a cocrosslinking agent, an acid acceptor (such as MgO which is used in the other vulcanization system), and an inorganic accelerator (such as $Ca(OH)_2$). Needless to say, the FKM compound may be incorporated with a reinforcing agent (e.g., carbon black), processing aid, coloring agent, and antiscorching agent.

Examples of the above-mentioned peroxide include dicumyl peroxide, 2,5-dimethyl-2,5-di(t-butylperoxy)-hexane, 2,5-dimethyl-2,5-di(t-butylperoxy)hexyne-3, 1,1-bis(t-butylperoxy)-3,3,5-trimethylcyclohexane, and t-butylperoxybenzoate. The amount of the peroxide is usually 1 to 10 PHR.

(4) The peroxide vulcanization system may have incorporated therein a polyol vulcanization agent and accelerator used for the polyol vulcanization system. The amount of the vulcanizing agent and the amount of the vulcanization accelerator are each 0.5 to 5 PHR.

(5) Other auxiliaries include carbon black as a reinforcing agent, MgO or Ca(OH)$_2$ as an acid acceptor, and a plasticizer, and a processing aid. They are properly incorporated as required.

(B) NBR layer

The NBR layer, a constituent of the laminate of the invention, is made of a NBR compound incorporated with not less than 5 PHR of an oxide or hydroxide of a metal belonging to Groups II–IV in the Periodic Table, together with other auxiliaries. Where the compound previously contains a metal oxide as a vulcanization assistant, the above-mentioned amount is in addition to it.

(1) NBR is an acrylonitrile-butadiene copolymer. The one containing 15 to 55% of acrylonitrile is preferred from the standpoint of oil resistance and cold-temperature resistance of the NBR layer produced from it. Commercial examples of NBR include Nipol DN101, 103, 202, 302 and 206; JSR N220S, N230S, and N2310; and Hycar 1001, 1031, and 1042, "Nipol" and "Hycar" are trademarks of Nihon Zeon and "JSR" is a trademark of Japan Synthetic Rubber Co., Ltd.

(2) The vulcanization system of the NBR is not specifically limited; and it may be vulcanized with sulfur or a peroxide or any other vulcanizing agent. Examples of the peroxide vulcanizing agent are mentioned above.

(3) Examples of the metal oxide include magnesium oxide, aluminum oxide, zinc oxide, zinc dioxide, calcium oxide, lead (II, IV) oxide, and silicon dioxide. Hydroxides of these metals can also be used. Preferable among them are magnesium oxide, calcium hydroxide, aluminum hyroxide, and lead oxide (II). The amount of the metal oxide to be incorporated is usually 5 to 30 PHR. With less than 5 PHR, the effect of the invention (good vulcanization bonding to the FKM layer) is not produced.

Figure 2:
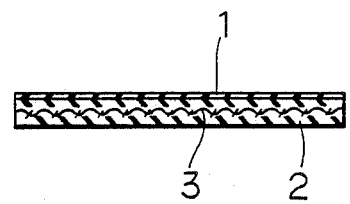
FIG. 2 is a sectional view of a diaphragm which is an example of the rubber laminate of the invention.

(4) Other auxiliaries incorporated into the NBR include a reinforcing agent, vulcanization accelerator, processing aid, and plasticizer. They are properly incorporated as required. (C) There is no restriction in the method of bonding through vulcanization the fluororubber layer 1 of the above-mentioned compound (A) and the NBR layer 2 (base layer) of the above-mentioned compound (B) to each other. For example, in the case of a rubber hose as shown in FIG. 1, the two compounds are extruded one after the other by a single extruder or simultaneously by two extruders to form a laminated hose, which subsequently undergoes vulcanization bonding under proper conditions (e.g., at 145° to 170° C. for 30 to 90 minutes). In the case of a diaphragm comprising a fluororubber layer 1, a NBR layer 2, and a fabric layer 3 as shown in FIG. 2, each compound is formed into a sheet by rolling, and the sheets placed one over another are press-molded (at a mold temperature of 150° to 190° C., for 3 to 30 min, and under 50 to 150 kgf/cm$^2$), whereby bonding through vulcanization is achieved. The construction of the rubber laminate is not limited to the illustrated examples. The present invention may be applied to reinforced hoses, hoses and diaphragm having the FKM layers as the inner and outer layers (or the upper and under surfaces), and all-rubber diaphragms.

EXAMPLES

In Examples 1 to 8 and Comparative Examples 1 to 14, test specimens were prepared as follows:

The FKM compounds were prepared according to the formulation shown below.

| Formulation of FKM compounds (unit: parts by weight) | |
|---|---|
| Polymer | 100 |
| MT black | 20 |
| MgO | 3 |
| Ca(OH)$_2$ | 6 |
| Organic polyol | 1.3 |
| Vulcanization accelerator | varied |

The type of the polymer and the name and amount of the vulcanization accelerator are shown in Table 1.

The NBR compounds were prepared according to the formulation shown below.

| Formulation of NBR compounds (unit: parts by weight) | |
|---|---|
| Polymer (JSR N230S) | 100 |
| MAF black | 50 |
| Stearic acid | 1 |
| Zinc oxide | 5 |
| Ca(OH)$_2$ | 20 or 0 |
| Cocrosslinking agent | 3 |
| Organic peroxide | 3 |

The type of the polymer and the name and amount of the vulcanization accelerator are shown in Table 1. The NBR compound containing 20 PHR of Ca(OH)$_2$ is designated as "N-1" and the NBR compound containing none of Ca(OH)$_2$ is designated as "N-0".

Each of the FKM compounds and the NBR compounds was rolled into a 4 mm thick sheet. The resulting FKM sheet and NBR sheet were bonded together according to the combination as shown in Table 1. The bonding was performed by vulcanization at 170° C. for 15 minutes under a pressure of 150 kgf/cm$^2$. The bonding strength was measured in accordance with JIS K6301 (Peel test). The test results are shown in Table 1.

TABLE 1

| Examples | FKM Layer Polymer | Vulcanization accelerator | | NBR layer | bonding strength (kgf/2.54 cm) |
|---|---|---|---|---|---|
| Comparative Example 1 | Viton E45 (bipolymer) | Organic phosphonium salt | 0.45 (PHR) | N-1 | <1.0 |
| Example 1 | " | | 0.6 | N-1 | 7.6 |
| Example 2 | " | | 7.2 | N-1 | >11 |
| Example 3 | " | | 2.0 | N-1 | >11 |
| Comparative Example 2 | " | | 2.5 | N-1 | Unmeasurable |

TABLE 1-continued

| Examples | FKM Layer | | NBR layer | bonding strength (kgf/2.54 cm) |
|---|---|---|---|---|
| | Polymer | Vulcanization accelerator | | |
| Comparative Example 3 | " | | 0.6 | N-0 | <1.0 |
| Comparative Example 4 | " | | 1.2 | N-0 | <1.0 |
| Comparative Example 5 | " | | 2.0 | N-0 | <1.0 |
| Comparative Example 6 | Dai-el G704 (bipolymer) | Quaternary | 0.3 | N-1 | <1.0 |
| Example 4 | " | ammonium | 0.5 | N-1 | 8.0 |
| Example 5 | " | salt | 1.0 | N-1 | >11 |
| Example 6 | " | | 2.0 | N-1 | >11 |
| Comparative Example 7 | " | | 2.5 | N-1 | Unmeasurable |
| Comparative Example 8 | " | | 0.5 | N-0 | <1.0 |
| Comparative Example 9 | " | | 1.0 | N-0 | <1.0 |
| Comparative Example 10 | " | | 2.0 | N-0 | <1.0 |
| Comparative Example 11 | Dai-el G901 (terpolymer) | Quaternary | 0.6 | N-1 | 1.2 |
| Example 7 | " | ammonium | 0.8 | N-1 | 6.3 |
| Example 8 | " | salt | 2.5 | N-1 | >11 |
| Comparative Example 12 | " | | 3.0 | N-1 | Unmeasurable |
| Comparative Example 13 | " | | 0.8 | N-0 | <1.0 |
| Comparative Example 14 | " | | 2.5 | N-0 | <1.0 |

Note:
Bonding strength greater than 11 means the failure of rubber.
N-1 = NBR + 20 PHR Ca(OH)$_2$
N-0 = NBR w/o Ca(OH)$_2$.

N-1=NBR+20 PHR Ca(OH)$_2$ N-0=NBR w/o Ca(OH)$_2$.

The layer-to-layer bonding strength was so high as to break the rubber layer (in Examples 2, 3, 5, 6, and 8) or close to it (in Examples 1, 4 and 7). In contrast, where the FKM compound contains too small an amount of vulcanization accelerator (as in Comparative Examples 1, 6, and 11) and where the NBR compound contains no metal oxide (as in Comparative Examples 3, 4, 5, 8, 9, 10, 13, and 14), the bonding strength was so small that interfacial failure took place between the FKM layer and the NBR layer. Where the FKM compound contains an excess amount of vulcanization accelerator (as in Comparative Examples 2, 7, and 12), scorching took place in the FKM layer during vulcanization bonding, which made it impossible to prepare test specimens.

In Examples 9 L to 12 Comparative Examples 15 to 21, test specimens were prepared as follows:

The FKM compounds were prepared according to the formulation shown below.

| Formulation of FKM compounds (unit: parts by weight) | |
|---|---|
| Polymer (Dai-el G901) | 100 |
| MT black | 20 |
| MgO | 3 |
| Ca(OH)$_2$ | 6 |
| Organic peroxide | varied |
| Cocrosslinking agent | varied |
| Organic polyol | varied |

Vulcanization accelerator varied The varied amount are shown in Table 2.

The NBR compounds were prepared in the same manner as mentioned above.

Each of the FKM compounds and the NBR compound was rolled into a 4 mm thick sheet. The resulting FKM sheet and NBR sheet were bonded together according to the combination as shown in Table 2. The bonding was performed in the same manner as mentioned above. The bonding strength was measured in accordance with JIS K6301 (Peel test), in the orginal state and after immersion in full D at 40° C. 49 hours. The FKM compound was also vulcanized under pressure under the same conditions as mentioned above to give a 2 mm thick sheet. Test specimens were cut out of this sheet and they were examined for physical properties in original state and compression set according to JIS K6301. The results are shown in Table 2.

TABLE 2

(Unit: PHR)

| | Example | | | | Comparative Example | | | | | | |
|---|---|---|---|---|---|---|---|---|---|---|---|
| | 9 | 10 | 11 | 12 | 15 | 16 | 17 | 18 | 19 | 20 | 21 |
| FKM layer | | | | | | | | | | | |
| Organic peroxide | 3 | 1.5 | 3 | 1.5 | 3 | — | — | 3 | 1.5 | 3 | 1.5 |
| Cocrosslinking agent | 3 | 1.5 | 3 | 1.5 | 3 | — | — | 3 | 1.5 | 3 | 1.5 |
| Organic polyol | 2.3 | 2.3 | 2.3 | 2.3 | — | 2.3 | 2.3 | 2.3 | 2.3 | 2.3 | 2.3 |
| Quaternary ammonium salt | 1.2 | 1.2 | — | — | — | 1.2 | — | 1.2 | 1.2 | — | — |
| Quaternary phosphonium salt | — | — | 1.2 | 1.2 | — | — | 1.2 | — | — | 1.2 | 1.2 |
| FKM original state properties | | | | | | | | | | | |
| Hs (JIS-A) | 82 | 82 | 81 | 80 | 71 | 83 | 80 | 82 | 82 | 81 | 80 |
| T$_B$ (kg/cm$^2$) | 163 | 145 | 149 | 155 | 210 | 114 | 96 | 163 | 155 | 149 | 145 |
| E$_B$ (%) | 210 | 240 | 230 | 250 | 320 | 460 | 480 | 210 | 240 | 230 | 250 |
| FKM compression set | | | | | | | | | | | |
| 120° C. × 22 h Cs (%) | 34 | 34 | 36 | 35 | 11 | 74 | 81 | 34 | 34 | 36 | 35 |
| 120° C. × 22 h Cs (%) | 49 | 47 | 50 | 48 | 13 | 84 | 89 | 49 | 47 | 50 | 48 |
| NBR layer | N-1 | N-1 | N-1 | N-1 | N-1 | N-1 | N-1 | N-0 | N-0 | N-0 | N-0 |
| Bonding strength (kgf/2.54 cm) | | | | | | | | | | | |
| Original state | >0.95 | >13.3 | >10.7 | >12.8 | 3.1 | >13.4 | >12.4 | <1.0 | <1.0 | <1.0 | <1.0 |

TABLE 2-continued (Unit: PHR)

| | Example | | | | Comparative Example | | | | | |
|---|---|---|---|---|---|---|---|---|---|---|
| | 9 | 10 | 11 | 12 | 15 | 16 | 17 | 18 | 19 | 20 | 21 |
| After immersion in fuel D | >11.4 | >9.5 | >9.5 | >10.2 | 1.9 | 13.9 | >10.6 | — | — | — | — |

Note:
In Examples 9 to 12 and Comparative Examples 16 and 17, rubber failure occurred in the test in the original state and after immersion in fuel; but in other examples, interfacial failure occurred in the same test.

In Examples 9 to 12, the layer-to-layer bonding strength was so high as to break the rubber layer and the FKM compound was good in compression set. In contrast, where the FKM compound contains none of polyol vulcanizing compound (as in Comparative Example 15) and where the NBR compound contains no metal oxide (as in Comparative Examples 18 to 21), the bonding strength was so small that interfacial failure took place between the FKM layer and the NBR layer. Where the FKM compound contains the polyol vulcanizing compound (as in Comparative Examples 16 and 17), the layer-to-layer bonding strength was as high as in Examples 9–12; but the FKM compound was poor in compression set.

What is claimed is:

1. A rubber laminate which comprises a FKM layer of the following compound (A) and a NBR layer of the following compound (B), said layers being bonded together through vulcanization, wherein
   (A) is a FKM compound containing a polyol vulcanization system in which the polymer is vinylidene fluoride-propylene hexafluoride copolymer, the vulcanization agent is an aromatic polyol in an amount of 1.3 to 2 PHR and the vulcanization accelerator is an organic phosphonium salt or quaternary ammonium salt, said vulcanization accelerator being present in an amount of 0.5 to 2.2 PHR, and
   (B) is a NBR compound having incorporated therein calcium hydroxide in an amount of 5 to 30 PHR.

2. A rubber laminate as set forth in claim 1, wherein said NBR compound is an acrylonitrile-butadiene copolymer containing 15 to 55% acrylonitrile and the polyol vulcanization system includes other auxiliaries.

3. A rubber laminate which comprises a FKM layer of the following compound (A) and a NBR layer of the following compound (B), said layers being bonded together through vulcanization, wherein
   (A) is a FKM compound containing a polyol vulcanization system in which the polymer is vinylidene fluoride-propylene hexafluoride-ethylene tetrafluoride terpolymer, the vulcanization agent is an aromatic polyol in an amount of 1.3 to 2 PHR and the vulcanization accelerator is an organic phosphonium salt or quaternary ammonium salt, said vulcanization accelerator being present in an amount of 0.8 to 2.7 PHR, and
   (B) is a NBR compound having incorporated therein calcium hydroxide in an amount of 5 to 30 PHR.

4. A rubber laminate as set forth in claim 3, wherein said NBR compound is an acrylonitrile-butadiene copolymer containing 15 to 55% acrylonitrile and the polyol vulcanization system includes other auxiliaries.

5. A rubber laminate which comprises a FKM layer of the following compound (A) and a NBR layer of the following compound (B), said layers being bonded together through vulcanization, wherein
   (A) is a FKM compound containing a peroxide vulcanization system comprising an organic peroxide, an acid acceptor, an inorganic accelerator, and a co-crosslinking agent and a polyol vulcanization system comprising an aromatic polyol compound as the vulcanization agent in an amount of 0.5–5 PHR and an organic phosphonium salt or quaternary ammonium salt as vulcanization accelerator in an amount of 0.5–5 PHR, and
   (B) is NBR compound having incorporated therein calcium hydroxide in an amount of 5 to 30 PHR.

6. A rubber laminate as set forth in claim 5, wherein said NBR compound is an acrylonitrile-butadiene copolymer containing 15 to 55% acrylonitrile and the peroxide-polyol vulcanization systems include other auxiliaries.

7. A rubber laminate as set forth in claim 5 wherein said FKM compound is a vinylidene fluoride-propylene hexafluoride-ethylene tetrafluoride terpolymer.

8. A rubber laminate which comprises a FKM layer of the following compound (A) in which the polymer is vinylidene fluoride-propylene hexafluoride copolymer, and a NBR layer of the following compound (B) in which the polymer is an acrylonitridebutadiene copolymer containing 15 to 55% acrylonitrile, said layers being bonded together through vulcanization, wherein:
   (A) is a FKM compound containing a polyol vulcanization system agent comprising an aromatic polyol in an amount of 1.3 to 2 phr as the vulcanization agent, and an organic phosphonium salt or quaternary ammonium salt as the vulcanization accelerator in an amount of 0.5 to 2.2 PHR, and other auxiliaries, and
   (B) is a NBR compound having incorporated therein calcium hydroxide in an amount of 5 to 30 PHR and other auxiliaries.

* * * * *